US012233335B2

(12) United States Patent
Wan et al.

(10) Patent No.: US 12,233,335 B2
(45) Date of Patent: Feb. 25, 2025

(54) AUTOMATIC SELECTION OF OPERATION EXECUTION RANGE AND TARGET VIRTUAL OBJECT

(71) Applicant: TENCENT TECHNOLOGY (SHENZHEN) COMPANY LIMITED, Guangdong (CN)

(72) Inventors: Yulin Wan, Shenzhen (CN); Xun Hu, Shenzhen (CN); Shandong Su, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 18/651,290

(22) Filed: Apr. 30, 2024

(65) Prior Publication Data
US 2024/0278120 A1   Aug. 22, 2024

Related U.S. Application Data

(63) Continuation of application No. 17/507,348, filed on Oct. 21, 2021, now Pat. No. 12,005,353, which is a (Continued)

(30) Foreign Application Priority Data

Jun. 5, 2020 (CN) ............ 202010507422.3

(51) Int. Cl.
A63F 13/426 (2014.01)
A63F 13/537 (2014.01)
(Continued)

(52) U.S. Cl.
CPC .......... *A63F 13/426* (2014.09); *A63F 13/537* (2014.09); *A63F 13/55* (2014.09);
(Continued)

(58) Field of Classification Search
CPC ...... A63F 13/426; A63F 13/537; A63F 13/55; A63F 13/56; G06F 3/04815; G06F 3/04842; G06F 3/04847
(Continued)

(56) References Cited

U.S. PATENT DOCUMENTS 9,675,872 B2    6/2017  Tabata et al.
9,901,821 B2 *  2/2018  Matsui .................. A63F 13/45
(Continued)

FOREIGN PATENT DOCUMENTS

CN    104915117 A    9/2015
CN    105194873 A    12/2015
(Continued)

OTHER PUBLICATIONS

International Search Report & Written Opinion issued Aug. 18, 2021, in PCT/CN2021/095034, (11 pages).
(Continued)

Primary Examiner — Allen Chan
(74) Attorney, Agent, or Firm — ArentFox Schiff LLP

(57) ABSTRACT

A virtual object selection method is described. The method includes displaying, on a user interface, a display picture corresponding to a virtual environment and a first virtual object located in the virtual environment. Further, the method includes obtaining a set execution range of a first operation of the first virtual object in the virtual environment, and determining a priority execution range of the first operation in the virtual environment, the priority execution range being within the set execution range and smaller than the set execution range. In addition, the method includes selecting a second virtual object from the priority execution range as a target virtual object corresponding to the first operation. Apparatus and non-transitory computer-readable medium counterpart embodiments are also provided.

20 Claims, 9 Drawing Sheets

Related U.S. Application Data continuation of application No. PCT/CN2021/095034, filed on May 21, 2021.

(51) Int. Cl.
*A63F 13/55* (2014.01)
*G06F 3/04815* (2022.01)
*G06F 3/04842* (2022.01)
*G06F 3/04847* (2022.01)

(52) U.S. Cl.
CPC ...... *G06F 3/04815* (2013.01); *G06F 3/04842* (2013.01); *G06F 3/04847* (2013.01)

(58) Field of Classification Search
USPC ............................................. 715/771; 463/33
See application file for complete search history.

(56) References Cited

U.S. PATENT DOCUMENTS

| | | |
|---|---|---|
| 11,465,048 B2 | 10/2022 | Hu et al. |
| 2015/0375110 A1 | 12/2015 | Volkov |
| 2017/0291108 A1 | 10/2017 | Kim |
| 2017/0361230 A1 | 12/2017 | Tang et al. |
| 2018/0121086 A1 | 5/2018 | Wang |
| 2021/0275914 A1 | 9/2021 | Wu et al. |

FOREIGN PATENT DOCUMENTS

| | | |
|---|---|---|
| CN | 107398071 A | 11/2017 |
| CN | 107441707 A | 12/2017 |
| CN | 108310772 A | 7/2018 |
| CN | 110170168 A | 8/2019 |
| CN | 111672113 A | 9/2020 |
| JP | 2003-079952 A | 3/2003 |
| JP | 2005-224281 A | 8/2005 |
| JP | 2008-188322 A | 8/2008 |
| JP | 2010-005209 A | 1/2010 |
| JP | 2018-525056 A | 9/2018 |
| JP | 2019-136358 A | 8/2019 |

OTHER PUBLICATIONS

Office Action received for Chinese Patent Application No. 202010507422.3, mailed on May 19, 2021, 13 pages (5 pages of English Translation and 8 pages of Original Document).

Office Action received for Japanese Patent Application No. 2021-564717, mailed on Jun. 14, 2022, 10 pages (5 pages of English Translation and 5 pages of Original Document).

Singaporean Office Action and Search Report mailed Mar. 1, 2023 in Application No. 11202111517Y, 10 pages.

\* cited by examiner

AUTOMATIC SELECTION OF OPERATION EXECUTION RANGE AND TARGET VIRTUAL OBJECT

RELATED APPLICATIONS

This application is a continuation of U.S. application Ser. No. 17/507,348 "VIRTUAL OBJECT SELECTION METHOD AND APPARATUS, DEVICE, AND STORAGE MEDIUM" filed on Oct. 21, 2021, which is a continuation of International Application No. PCT/CN2021/095034, entitled "VIRTUAL OBJECT SELECTION METHOD AND APPARATUS, DEVICE, AND STORAGE MEDIUM," and filed on May 21, 2021, which claims priority to Chinese Patent Application No. 202010507422.3, filed on Jun. 5, 2020, and entitled "VIRTUAL OBJECT SELECTION METHOD AND APPARATUS, DEVICE, AND STORAGE MEDIUM". The entire disclosures of the above-identified prior applications are incorporated herein by reference in their entirety.

FIELD OF THE TECHNOLOGY

Embodiments of this disclosure relate to the field of computer and Internet technologies, including a virtual object selection method and apparatus, a terminal, and a storage medium.

BACKGROUND OF THE DISCLOSURE

In a multiplayer online battle arena (MOBA) game, a user may log in to a client of the MOBA game to control a virtual object corresponding to the user in a virtual environment.

In the related art, the user may control the virtual object corresponding to the user to cast a particular skill, and the skill may produce an effect such as damage to a target virtual object in the virtual environment. In the related art, in a user interface displayed by the client, each skill corresponds to an operation button, and the user may actively select the target virtual object by touching the operation button. However, in the related art, the user may need to spend a large amount of time to touch the operation button corresponding to an operation to select an execution range, thereby increasing operation time costs of the user and decreasing the operation efficiency. In addition, in the related art, due an excessively large set execution range, a finally selected target virtual object in the virtual environment can exceed a UI displayed by the client, is located at the edge of a user interface (UI), or is blocked by an icon in a UI, thereby preventing the user from viewing a function effect of the operation on the target virtual object while decreasing the effectiveness of the target virtual object and the accuracy of the operation of the target virtual object, and decreasing a display effect of the UI.

SUMMARY

Embodiments of this disclosure provide a virtual object selection method and apparatus, a terminal, and a storage medium. The technical solutions are as follows.

According to an aspect, an embodiment of this disclosure provides a virtual object selection method, including: (1) displaying, on a user interface, a display picture corresponding to a virtual environment and a first virtual object located in the virtual environment; (2) obtaining a set execution range of a first operation of the first virtual object in the virtual environment; (3) determining a priority execution range of the first operation in the virtual environment, the priority execution range being within the set execution range and smaller than the set execution range; and (4) selecting a second virtual object from the priority execution range as a target virtual object corresponding to the first operation.

According to another aspect, an embodiment of this disclosure provides a virtual object selection apparatus, including circuitry configured to (1) cause to be displayed a display picture corresponding to a virtual environment and a first virtual object located in the virtual environment on a user interface; (2) obtain a set execution range of a first operation of the first virtual object in the virtual environment; (3) determine a priority execution range of the first operation in the virtual environment, the priority execution range being within the set execution range and smaller than the set execution range; and (4) select a second virtual object from the priority execution range as a target virtual object corresponding to the first operation.

According to still another aspect, an embodiment of this disclosure provides a terminal, including processing circuitry and a memory, the memory storing at least one instruction, at least one program, a code set, or an instruction set, the at least one instruction, the at least one program, the code set, or the instruction set being loaded and executed by the processing circuitry to implement the virtual object selection method.

According to yet another aspect, an embodiment of this disclosure provides a non-transitory computer-readable storage medium, storing at least one instruction, at least one program, a code set, or an instruction set, the at least one instruction, the at least one program, the code set, or the instruction set being loaded and executed by processing circuitry to implement the virtual object selection method.

According to still yet another aspect, a computer program product is provided, the computer program product, when run on a terminal, causing the terminal to perform the virtual object selection method.

BRIEF DESCRIPTION OF THE DRAWINGS

To describe the technical solutions in the embodiments of this disclosure more clearly, the following briefly describes the accompanying drawings for describing the embodiments. The accompanying drawings in the following descriptions are merely some embodiments of this disclosure, and a person of ordinary skill in the art may further obtain other accompanying drawings according to the accompanying drawings.

DESCRIPTION OF EMBODIMENTS

To make the objectives, technical solutions, and advantages of this disclosure clearer, implementations of this disclosure are further described below in detail with reference to the accompanying drawings.

Figure 1:
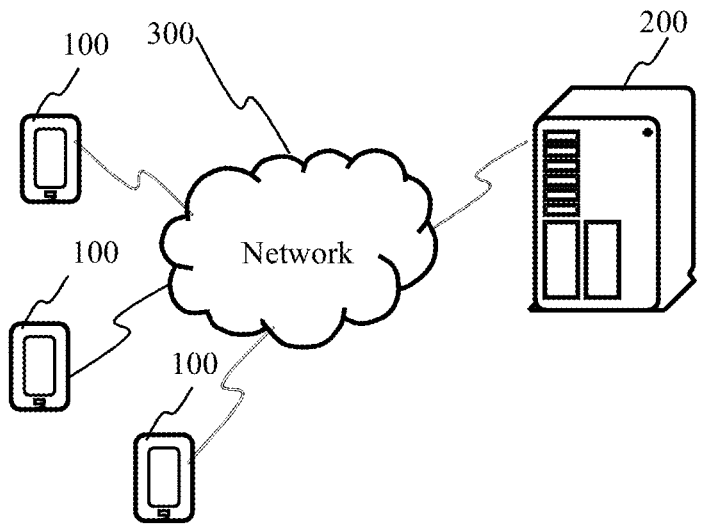
FIG. 1 is a schematic diagram of an application run environment according to embodiment of this disclosure.

FIG. 1 shows a schematic diagram of an application run environment according to embodiment of this disclosure. The application run environment may include a terminal 100 and a server 200.

The terminal 100 may be an electronic device such as a mobile phone, a tablet computer, a game console, an e-book reader, a multimedia player, a wearable device, and a personal computer (PC). A client of an application may be installed on the terminal 100.

In this embodiment of this disclosure, the application may be any application that can provide a virtual environment for a virtual object that is substituted and operated by a user to move in the virtual environment. Typically, the application is a game application, for example, a multiplayer online battle arena (MOBA) game, a battle royale (BR) game, a third-person shooting (TPS) game, a first-person shooting (FPS) game, or a multiplayer shooting survival game. Certainly, apart from game applications, another type of application can also present a virtual object to a user and provide a corresponding function for the virtual object, for example, a virtual reality (VR) application, an augmented reality (AR) application, a three-dimensional map program, a military simulation program, a social application, or an interactive entertainment application. This is not limited in this embodiment of this disclosure. Besides, shapes as well as corresponding functions of virtual objects provided by different applications are different and may be preset according to an actual requirement. This is not limited in this embodiment of this disclosure. In an embodiment, a client of the application runs in the terminal 100. In some embodiments, the application is an application developed based on a three-dimensional virtual environment engine, for example, the virtual environment engine is a unity engine. The virtual environment engine can build a three-dimensional virtual environment, a virtual object, a virtual prop, and the like and bring more immersive game experience to the user.

The virtual environment is a scene displayed (or provided) when a client of an application (for example, a game application) runs on a terminal. The virtual environment refers to a scene, for example, a virtual house, a virtual island, a virtual map, or a virtual building, created for a virtual object to perform activities (for example, game competition). The virtual environment may be a simulated environment of a real world, or may be a semi-simulated semi-fictional environment, or may be an entirely fictional environment. The virtual environment may be a two-dimensional virtual environment, a 2.5-dimensional virtual environment, or a three-dimensional virtual environment. This is not limited in this embodiment of this disclosure.

The virtual object may be a virtual role controlled by a user account (for example, a user account registered on a server of an application) in the application or may be a virtual role controlled by a computer program in an application. For example, the application is a game application, and the virtual object may be a game role controlled by a user account in the game application, or may be a game monster controlled by a computer program in the game application. The virtual object may be in a human shape, an animal shape, a cartoon shape, or another shape. This is not limited in this embodiment of this disclosure. The virtual object may be presented in a three-dimensional form or a two-dimensional form, which is not limited in the embodiments of this disclosure. In an embodiment, when the virtual environment is a three-dimensional virtual environment, the virtual object is a three-dimensional model created based on a skeletal animation technology. Each virtual object has a shape and size in the three-dimensional virtual environment, and occupies some space in the three-dimensional virtual environment. In this embodiment of this disclosure, the terminal 100 may receive an operation of a virtual object, determine an effective execution range according to a set execution range of the operation and a visible boundary range in a virtual environment, and select a target virtual object corresponding to the operation from the effective execution range.

In a possible implementation, the virtual objects include virtual objects in the same camp and virtual objects in different camps, that is, in an application, the virtual objects are divided into different camps. For example, a MOBA game is used as an example, and 10 users are matched for a game and are divided into two teams of a red team and a blue team, that is, every five people are in a group. In this case, the red team and virtual objects in the red team are in the same camp and are in a teammate relationship with each other, the blue team and virtual objects in the blue team are in the same camp and are in a teammate relationship with each other, and the virtual objects in the red team and the virtual objects in the blue team are in different camps and are in a hostile relationship with each other.

The server 200 is configured to provide a back-end service to a client of an application in the terminal 100. For example, the server 200 may be a back-end server of the application. The server 200 may be one server, a server cluster including a plurality of servers, or a cloud computing service center. In an embodiment, the server 200 provides back-end services for applications in a plurality of terminals 100 at the same time.

In an embodiment, the terminal 100 may communicate with the server 200 through a network 300. The network may be a wired network or a wireless network. This is not limited in this embodiment of this disclosure.

Figure 2:
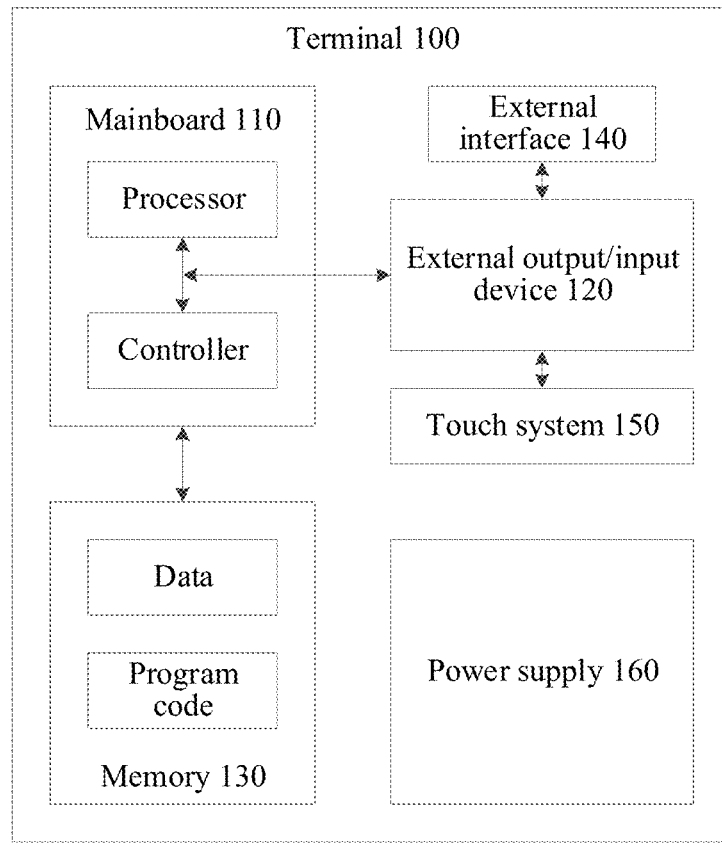
FIG. 2 is a schematic structural diagram of a terminal according to an embodiment of this disclosure.

FIG. 2 is a schematic structural diagram of a terminal according to an embodiment of this disclosure. The terminal 100 may include a mainboard 110, an external output/input device 120, a memory 130, an external interface 140, a touch system 150, and a power supply 160.

Processing elements such as a processor (processing circuitry) and a controller are integrated in the mainboard 110.

In an embodiment, for a terminal, the external output/input device 120 may include a display component (for example, a display screen), a sound playback component (for example, a speaker), a sound collecting component (for example, a microphone), various buttons, and the like. For a PC terminal, the external output/input device 120 may include a display component (for example, a display screen), a sound playback component (for example, a speaker), a sound collecting component (for example, a microphone), various buttons (for example, a mouse and a keyboard), and the like.

The memory 130 stores program code and data.

The external interface 140 may include an earphone interface, a charging interface, a data interface, and the like.

The touch system 150 may be integrated in the display component or the buttons of the external output/input device 120, and the touch system 150 is configured to detect touch operations performed by a user on the display component or the buttons.

The power supply 160 is configured to supply power to other components in the terminal 100.

In this embodiment of this disclosure, the processor (processing circuitry) in the mainboard 110 may generate a user interface (UI) (for example, a game interface) by executing or invoking the program code and data stored in the memory, and present the generated UI (for example, the game interface) by using the external output/input device 120. During presentation of the UI (for example, the game interface), a touch operation performed during interaction between the user and the UI (for example, the game interface) may be detected through the touch system 150, and a response is made to the touch operation.

According to the embodiments of this disclosure, the virtual object selection method may include three layers: a representation layer, which exists in a client and is configured to manage an input of the UI, transmit a data packet to a server, and perform data transmitted by a logical layer; the logical layer, which exists in the client and is configured to perform logical operation on the data and transmit the data after the operation to the representation layer for execution; and a server, which exists in a server end and is configured to receive the data transmitted by the representation layer and synchronize the data to the logical layer in the client. All the three layers may alternatively exist in the client. Details are not described herein again.

Figure 3:
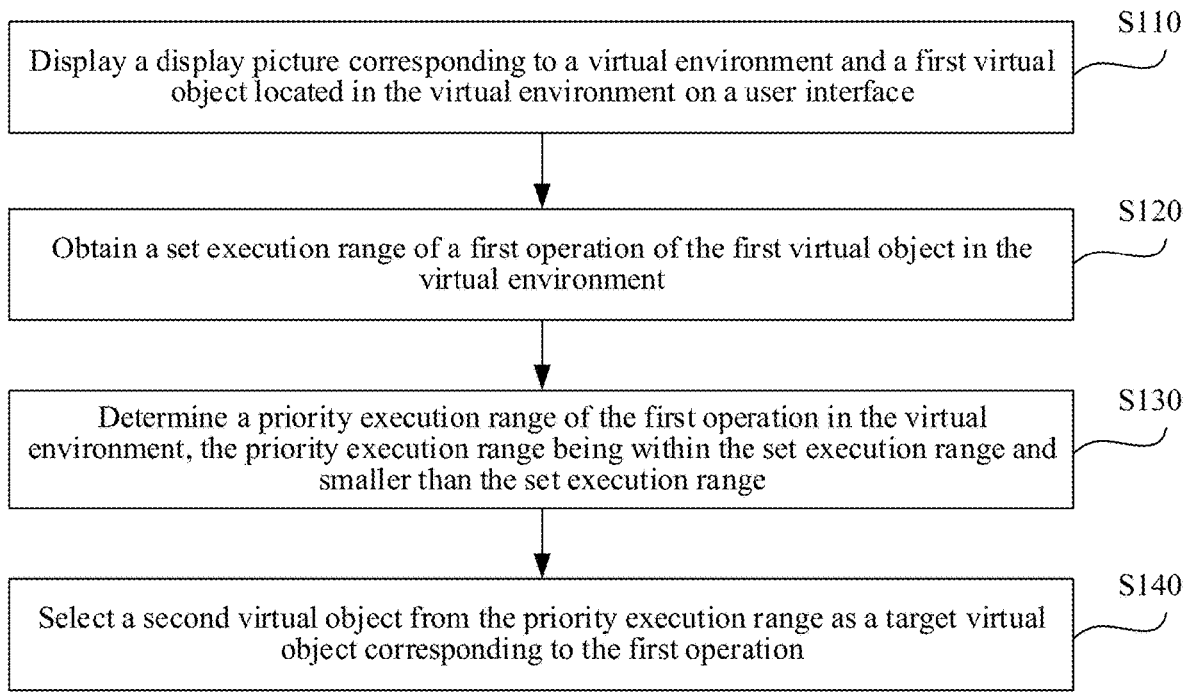
FIG. 3 is a flowchart of a virtual object selection method according to an embodiment of this disclosure.

FIG. 3 is a flowchart of a virtual object selection method according to an embodiment of this disclosure. The method is applicable to a client of the application, for example, applicable to the client (hereinafter referred to as the "client") installed on the terminal 100 in the application run environment shown in FIG. 1. The method may include the following several steps (S110 to S140).

In step S110, a display picture corresponding to a virtual environment and a first virtual object located in the virtual environment is displayed on a UI.

The UI is an interface of an application displayed to a user in a client. The application may be a computer program that needs to be downloaded and installed or may be a click-to-use computer program. In an embodiment, the application may be any application that can provide a virtual environment, for example, a game application. The UI includes a display picture of the virtual environment. The display picture may include a virtual item and a virtual object, for example, a virtual character, a virtual building, a virtual environment, and a virtual map. A user may control a first virtual object to interact with virtual items or virtual objects in the virtual environment.

In this embodiment of this disclosure, when receiving a start instruction of an application triggered by the user, the client may control running of the application and display a UI corresponding to the application. The UI includes a display picture corresponding to a virtual environment and a first virtual object located in the virtual environment, and the first virtual object may be a virtual object controlled by the user. In an embodiment, the first virtual object may be in a human shape, an animal shape, a cartoon shape, or another shape. This is not limited in this embodiment of this disclosure. In this embodiment of this disclosure, the first virtual object may be presented in a three-dimensional form or a two-dimensional form.

In step S120, a set execution range of a first operation of the first virtual object in the virtual environment is obtained.

The first operation may be any interactive operation between the first virtual object and the virtual environment. For example, the first operation is a skill casting operation of the first virtual object or a normal attack operation of the first virtual object. In an embodiment, an acted target corresponding to the interactive operation may be a virtual item in the virtual environment or may be another virtual object in the virtual environment. This is not limited in this embodiment of this disclosure.

In an example, the first operation is triggered by the first virtual object controlled by the user. For example, the user may trigger a trigger instruction of the first operation by clicking a corresponding icon in a UI or pressing a corresponding key, and then after receiving the trigger instruction, the client controls the first virtual object to perform the first operation.

In another example, the first operation is triggered by the first virtual object controlled by the computer program. For example, after running the application, the client may control, according to a preset rule, the first virtual object to perform the first operation.

The preset rule may be set flexibly. For example, the preset rule includes an online duration condition. The client may detect an online duration of the first virtual object, and if the online duration of the first virtual object meets the online duration condition, control the first virtual object to perform the first operation. In another example, the preset rule includes an attribute parameter condition. The client may detect an attribute parameter of the first virtual object, and if one or more attribute parameters of the first virtual object meet the attribute parameter condition, control the first virtual object to perform the first operation. The attribute parameter may include a life value, a defense value, an attack speed, or the like. This is not limited in this embodiment of this disclosure. Alternatively, the preset rule includes an operation parameter condition. The client may detect an operation parameter of the first virtual object, and if the operation parameter of the first virtual object meets the operation parameter condition, control the first virtual object to perform the first operation. The operation parameter may be a quantity of defeated monsters, a quantity of times of skill casting, a quantity of uses of an item, or the like. This is not limited in this embodiment of this disclosure. The description of the preset rule is merely exemplary and explanatory. In an actual application, the preset rule may be set flexibly according to an actual situation.

The set execution range is a function range of the first operation, and set execution ranges corresponding to different first operations may be different. In this embodiment of this disclosure, after displaying the UI, the client may obtain a set execution range of the first operation of the first virtual object in the virtual environment. A shape of the set execution range may be a circle, a fan shape, a rectangle, or a triangle. This is not limited in this embodiment of this disclosure.

In an example, the set execution range is a preset range, and the preset range is set by a designer or a user. For example, the set execution range may be determined according to an operation skill range and an additional range parameter. The operation skill range is a skill range corresponding to the first operation in the virtual environment, and the additional range parameter is a range parameter Y set outside the operation skill range when virtual objects (for example, virtual objects other than the first virtual object) are searched for. The set execution range may be a circular region with a current position of the first virtual object as a circle center and with a sum of the operation skill range and the additional range parameter (the skill range+Y) as a radius. In an embodiment, a position of the set execution range in the virtual environment changes with a change of a position of the first virtual object in the virtual environment. For example, in a case that the set execution range is a circular region with a current position of the first virtual object in the virtual environment as a circle center and with a sum of the operation skill range and the additional range parameter (skill range+Y) as a radius, the position of the first virtual object in the virtual environment changes, a position of the circle center of the set execution range in the virtual environment also changes, and the position of the set execution range in the virtual environment also changes. According to this embodiment of this disclosure, a position in the virtual environment may be mapped to a position on a UI and/or a display screen.

In another example, the set execution range is a condition range, and the condition range changes according to different conditions during running of an application. For example, the set execution range of the first operation may be in a positive correlation or a negative correlation with a quantity of executions of the first operation. In an actual application, the condition may be set flexibly according to an actual situation. This is not limited in this embodiment of this disclosure.

In this embodiment of this disclosure, after displaying a UI, the client may obtain a set execution range of a first operation in real time, and update the set execution range according to a change of position information of a first virtual object; or after receiving a trigger instruction of a first operation, the client may obtain a set execution range of the first operation. This is not limited in this embodiment of this disclosure.

In step S130, a priority execution range of the first operation in the virtual environment is determined, the priority execution range being within the set execution range and smaller than the set execution range.

In this embodiment of this disclosure, a priority execution range is further set within the set execution range of the first operation, the priority execution range being smaller than the set execution range. When determining a target virtual object in the virtual environment, the client may preferentially select the target virtual object from a relatively small priority execution range, to avoid a case that due to an excessively large set execution range, a finally selected target virtual object exceeds the UI displayed by the client or is blocked by an icon in the UI. In addition, in this embodiment of this disclosure, because the priority execution range is smaller than the set execution range, a stricter condition is set for selection of the target virtual object, so that a selection process of the target virtual object is more strategic, thereby saving computing resources.

A manner of determining the priority execution range is not limited in this embodiment of this disclosure. In an example, in a priority execution range determining process, the client determines the priority execution range according to a rule in real time. The rule may be preset by a user or may be preset by a developer. For example, the client determines the priority execution range according to a quarter of the set execution range. For example, a circle center position of the priority execution range is the same as a circle center position of the set execution range, but a radius of the priority execution range is a half of the set execution range. In another example, the user presets at least one priority execution range in the client, and in the priority execution range determining process, the client selects one priority execution range from the at least one priority execution range preset by the user. For example, for a case that the user presets a plurality of priority execution ranges, in the priority execution range determining process, the client selects one priority execution range randomly or selects one priority execution range according to a condition, for example, the client selects a priority execution range with a smallest range.

In one implementation, to provide the user with more space for autonomous setting and improve a matching degree between the priority execution range and a requirement of the user, the user may set related information about the priority execution range, so that the method further includes the following steps.

(1) Display an Operation Setting Interface.

In this embodiment of this disclosure, the UI displayed by the client may include an operation setting button. The user touches the operation setting button to trigger the client to display an operation setting interface. Certainly, the user may further control the client to display the operation setting interface in another manner such as in a gesture manner or in a voice manner. This is not limited in this embodiment of this disclosure. In an embodiment, the operation setting interface displayed by the client includes at least one operation control such as a button, a slider, and a text box that can be touched by the user.

(2) Receive a Range Setting Instruction.

Figure 4:
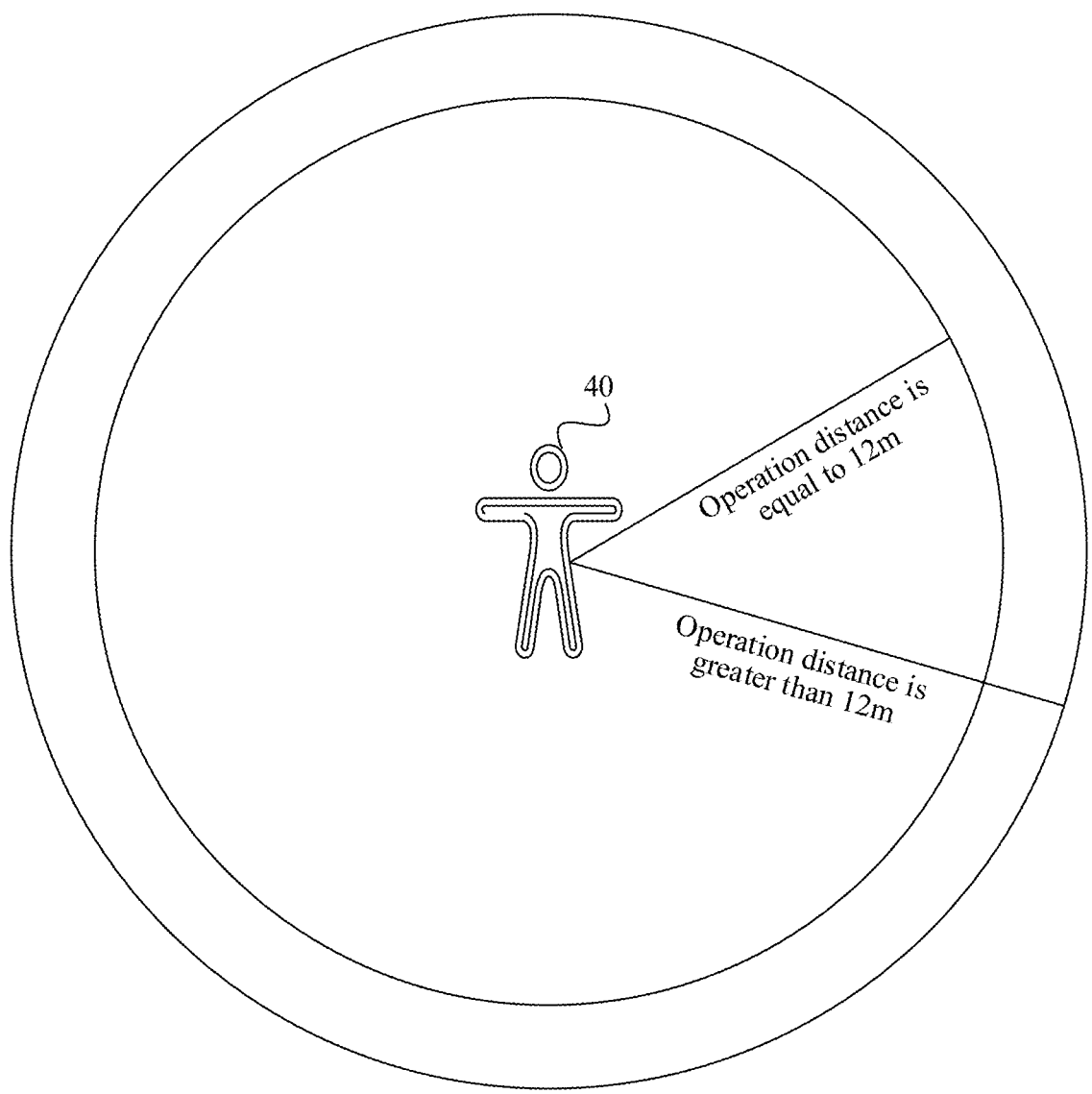
FIG. 4 is a schematic diagram of an operation distance of a first type operation according to an embodiment of this disclosure.

In this embodiment of this disclosure, the operation setting interface corresponds to a range setting control, and the range setting control may be a button, a slider, a text box, or the like. When the user touches the range setting control, the client may receive a range setting instruction, the range setting instruction being used for setting the priority execution range of the first operation. The range setting instruction may be used for setting a priority execution range of a single operation; or the range setting instruction is used for setting a priority execution range of a first type operation, the first type operation including the first operation. That is, the range setting instruction may be used for setting priority execution ranges of a plurality of operations of a type. In an embodiment, the first type operation is an operation of which an operation distance is greater than a threshold, the operation distance being a distance between the first virtual object and a farthest operation point of the first operation. For example, the client sets three types of operations based on the operation distance: a short-range operation, a remote operation, and an ultra-remote operation, and the client sets a corresponding threshold for each operation type. For example, as shown in FIG. 4, the first type operation is the ultra-remote operation. The client sets a corresponding threshold to 12 m for the ultra-remote operation, and an operation of which an operation distance (a distance between a first virtual object 40 and a farthest operation point of the first operation) is greater than 12 m is the first type operation. In an embodiment, the operation distance is an operation distance in a map of the virtual environment.

(3) Store Setting Information of the Priority Execution Range According to the Range Setting Instruction.

After receiving the range setting instruction, the client may determine setting information of the priority execution range, and store the setting information of the priority execution range for use in a subsequent process of determining the priority execution range. Content of the setting information of the priority execution range is not limited in this embodiment of this disclosure. In an embodiment, the setting information of the priority execution range includes at least one of the following: a radius of the priority execution range, a circle center of the priority execution range, a priority of the priority execution range, and the like.

In step S140, a second virtual object from the priority execution range is selected as a target virtual object corresponding to the first operation.

After determining the priority execution range, the client may determine a second virtual object within the priority execution range, the second virtual object being a virtual object on which the first operation can be performed. For example, it is assumed that the first operation is a skill such as increasing an amount of health, the second virtual object is a friend virtual object of the first virtual object, that is, the second virtual object and the first virtual object are in a teammate relationship with each other. It is assumed that the first operation is a skill such as an attack, the second virtual object is an enemy virtual object of the first virtual object, that is, the second virtual object and the first virtual object are in a hostile relationship with each other. In an embodiment, during determining of the second virtual object within the priority execution range, in addition to limiting a relationship between the second virtual object and the first virtual object, a shape of the second virtual object, a form of the second virtual object, or the like may be further limited. This is not limited in this embodiment of this disclosure. For example, the client may limit a state of the second virtual object to a non-invisible state or limit the second virtual object to a human form.

In response to determining that the priority execution range includes the second virtual object, the client may select the second virtual object from the priority execution range as the target virtual object corresponding to the first operation. When the priority execution range includes only one second virtual object, the client may directly determine the one second virtual object as the target virtual object. When the priority execution range includes a plurality of second virtual objects, the client may select the target virtual object from the plurality of second virtual objects.

The target virtual object is a virtual object on which the first operation is performed. When the first operation is an attack skill, the target virtual object is a virtual object attacked by the function skill. There may be one or more target virtual objects. Different maximum quantities of target virtual objects may be set for different operations (for example, different skills). For example, if a maximum quantity of target virtual objects corresponding to an operation is set to 1, it indicates that the operation can act on only one target virtual object at most and produce an effect on the one target virtual object. In another example, if a maximum quantity of target virtual objects corresponding to an operation is set to x (x is greater than 1), it indicates that the operation can act on x target virtual objects at most and can produce an effect on the x target virtual objects. In this embodiment of this disclosure, for different magnitude relationships between a maximum quantity of target virtual objects and a quantity of second virtual objects in the priority execution range, several manners of determining the target virtual object are provided.

For example, when the maximum quantity of target virtual objects is equal to or greater than the quantity of second virtual objects in the priority execution range, the client determines the second virtual objects in the priority execution range as the target virtual objects. For example, if the priority execution range includes only one second virtual object, and the maximum quantity of target virtual objects is also one, the client may directly determine the second virtual object as the target virtual object. In another example, if the priority execution range includes three second virtual objects, and the maximum quantity of target virtual objects is also three, the client determines the three second virtual objects as the target virtual objects. In still another example, if the priority execution range includes two second virtual objects, but the maximum quantity of target virtual objects is three, the client may determine the two second virtual objects as the target virtual objects.

For example, when the maximum quantity of target virtual objects is less than the quantity of second virtual objects in the priority execution range, the client selects the target virtual object from the second virtual objects in the priority execution range. For example, if the priority execution range includes five second virtual objects, but the maximum quantity of target virtual objects is three, the client may select three second virtual objects from the five second virtual objects as the target virtual objects. In another example, if the priority execution range includes three second virtual objects, but the maximum quantity of target virtual objects is one, the client may select one second virtual object from the three second virtual objects as the target virtual object.

In an example, it is assumed that there is one target virtual object, and if the priority execution range has only one second virtual object, the one second virtual object is determined as the target virtual object; and if there are a plurality (that is, greater than one) of second virtual objects in the priority execution range, one second virtual object is selected from the plurality of second virtual objects as the target virtual object.

A manner of selecting the target virtual object by the client is not limited in this embodiment of this disclosure. In an embodiment, the client selects the target virtual object randomly from the second virtual object included in the priority execution range; or the client select the target virtual object according to a rule from the second virtual object included in the priority execution range. For a description in which the client selects the target virtual object, reference may be made to the method embodiments below, and details are not described herein again.

Step S140 is performed when the priority execution range includes the second virtual object. However, in some cases, the priority execution range may not include the second virtual object. When the priority execution range does not include the second virtual object, this embodiment also provides several possible implementations of the client, and a description is made below.

In an example, the method further includes: selecting, in response to determining that the priority execution range does not include the second virtual object, a second virtual object from the set execution range as the target virtual object corresponding to the first operation. That is, when the priority execution range with a relatively small range does not include the second virtual object, the client may enlarge an execution range of the first operation and select the target virtual object from the second virtual objects included in the set execution range with a relatively large range, to ensure normal execution of the first operation, and enrich a selection manner of the target virtual object, so that the selection process of the target virtual object is more flexible.

In another example, the method further includes: determining, in response to determining that the priority execution range does not include the second virtual object, that the first operation is not performed. That is, when the priority execution range with a relatively small range does not include the second virtual object, the client does not perform the first operation, to avoid a case that the target virtual object is located outside the UI or at the edge of the UI when the client selects the target virtual object based on the set execution range with a relatively large range. When the first operation has an operation freezing time, a use resource of the first operation may be prevented from being wasted, the operation freezing time referring to that the first operation is in an inexecutable state in a preset time range, for example, the client cannot perform the first operation again within one minute after the first operation is performed.

Based on the foregoing, according to the technical solution provided in this embodiment of this disclosure, a set execution range of an operation of a virtual object controlled by a user is obtained, then a priority execution range of the operation that falls within the set execution range and that is smaller than the set execution range is determined, and a target virtual object on which the operation is performed is selected from the priority execution range. Because the set execution range and the priority execution range are automatically determined by the client according to a rule or a pre-stored setting, the user does not need to spend a large amount of time to touch an operation button corresponding to the operation to select an execution range, thereby reducing operation time costs of the user and improving the operation efficiency. In addition, in this embodiment, the client selects the target virtual object based on the priority execution range with a relatively small range, to avoid a case that due to an excessively large set execution range, a finally selected target virtual object in the virtual environment exceeds a UI displayed by the client, is located at the edge of a UI, or is blocked by an icon in a UI, thereby ensuring that the user can view a function effect of the operation on the target virtual object while improving the effectiveness of the target virtual object and the accuracy of the operation of the target virtual object, and improving a display effect of the UI. In addition, in this embodiment, the priority execution range is set within the set execution range, and a selection condition of the target virtual object may be enriched, so that the selection process of the target virtual object is more flexible. In addition, because the priority execution range is smaller than the set execution range, a stricter condition is set for selection of the target virtual object, so that the selection process of the target virtual object is more strategic, thereby saving computing resources.

In addition, according to the technical solution provided in this embodiment, an operation setting interface is displayed, and a range setting instruction used for setting the priority execution range is received, and then setting information of the priority execution range is stored according to the range setting instruction, so that the client automatically uses the setting information when selecting the target virtual object. Because the setting information of the priority execution range is autonomously set by the user, it is ensured that the target virtual object selected by the client based on the priority execution range matches a requirement of the user while more autonomous setting space may be provided to the user.

In this embodiment of this disclosure, the set execution range may include one priority execution range or may include a plurality of priority execution ranges. The two cases are described respectively below.

In an example, the set execution range includes one priority execution range, and step S130 includes determining the one priority execution range as the priority execution range of the first operation in the virtual environment.

Because the set execution range includes only one priority execution range, the client can determine the only priority execution range as the priority execution range of the first operation in the virtual environment. For a manner of determining one priority execution range in the set execution range, reference may be made to the method embodiment. Details are not described herein again.

Figure 5:
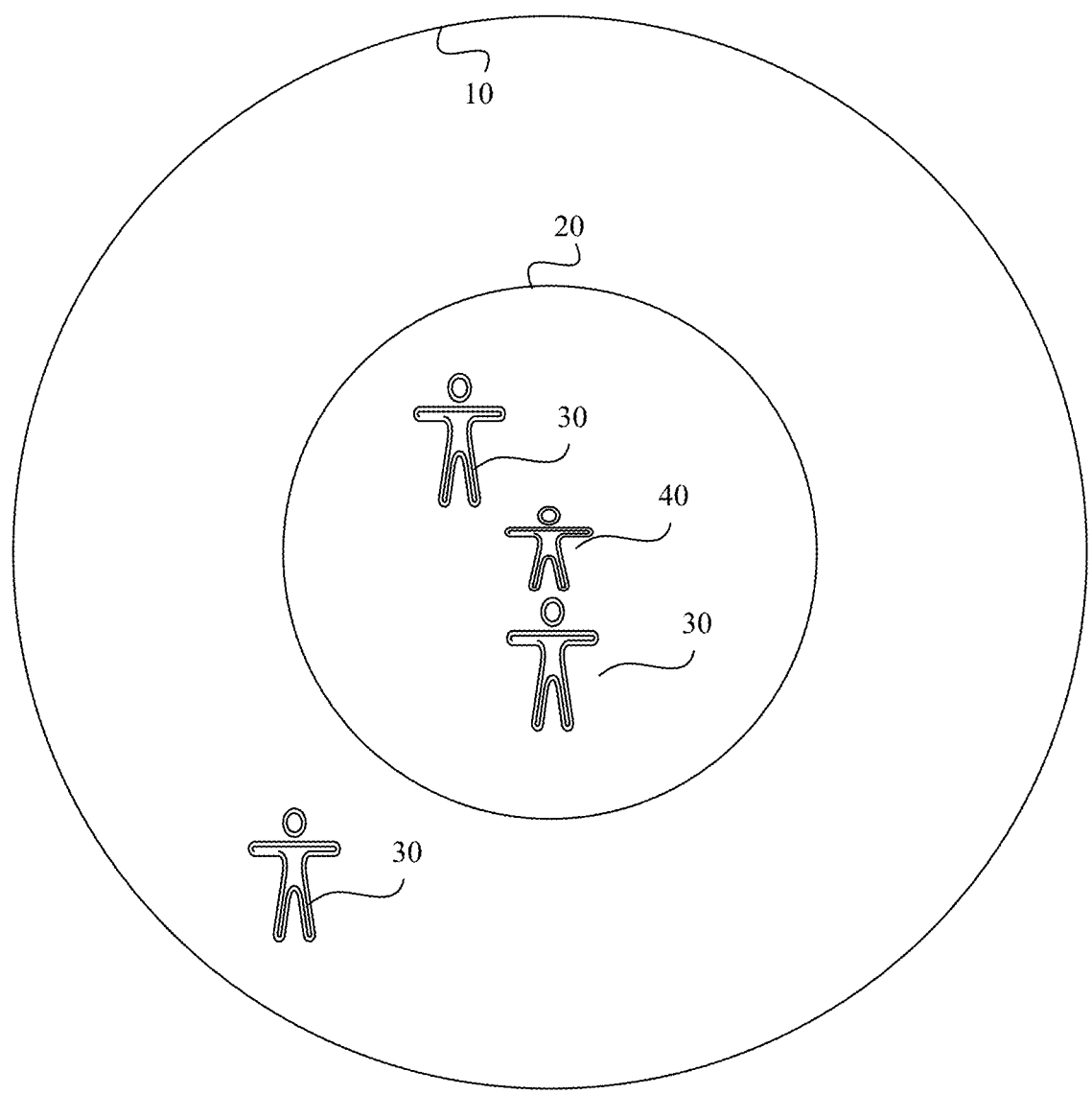
FIG. 5 is a schematic diagram of a priority execution range according to an embodiment of this disclosure.

For example, as shown in FIG. 5, it is assumed that both the set execution range and the priority execution range are circular regions. A set execution range 10 of a first operation includes one priority execution range 20, a circle center position of the priority execution range 20 coincides with a circle center position of the set execution range 10, and a radius of the priority execution range 20 is less than a radius of the set execution range 10. The circle center position of the priority execution range 20 and the circle center position of the set execution range 10 are, for example, a position of a first virtual object 40 in the virtual environment. It is assumed that there are second virtual objects 30 in both the priority execution range 20 and the set execution range 10 outside the priority execution range 20. However, when selecting the target virtual object, the client selects the target virtual object based on the second virtual objects 30 in the priority execution range 20.

In another example, the set execution range includes n priority execution ranges, n being an integer greater than 1, and step S130 includes: selecting, from the n priority execution ranges, a priority execution range that has a highest priority and includes the second virtual object, and determining the priority execution range as the priority execution range of the first operation in the virtual environment.

Because the set execution range includes a plurality of priority execution ranges, the client needs to select one priority execution range from the plurality of priority execution ranges as the priority execution range of the first operation. In an embodiment, the plurality of priority execution ranges have the same circle center position and different radiuses. In an embodiment, the plurality of priority execution ranges correspond to a plurality of priorities, respectively. The client selects, from the plurality of priority execution ranges, a priority execution range that has a highest priority and that includes the second virtual object as the priority execution range of the first operation.

A manner of determining the priorities corresponding to the plurality of priority execution ranges is not limited in this embodiment of this disclosure. In an embodiment, the priorities corresponding to the plurality of priority execution ranges are autonomously set by the user; or the priorities corresponding to the plurality of priority execution ranges are set by the client according to a size of the priority execution range. For example, the size of the priority is in negative correlation with the size of the range, that is, a smaller priority execution range indicates a larger priority of the priority execution range.

In an embodiment, the n priority execution ranges are in a nested relationship, an $i^{th}$ priority execution range falls within an $(i+1)^{th}$ priority execution range, and a priority of the $i^{th}$ priority execution range is higher than a priority of the $(i+1)^{th}$ priority execution range, i being a positive integer.

When the n priority execution ranges are in the nested relationship, the client first determines whether a first priority execution range that has a highest priority includes a second virtual object. When the first priority execution range includes the second virtual object, the first priority execution range is determined as the priority execution range of the first operation. When the first priority execution range does not include the second virtual object, the client further determines whether a priority execution range corresponding to a next smaller priority includes a second virtual object, that is, determines whether a second priority execution range includes the second virtual object, and so on. When an $i^{th}$ priority execution range does not include the second virtual object, it is determined whether an $(i+1)^{th}$ priority execution range includes a second virtual object, a priority of the $(i+1)^{th}$ priority execution range being lower than a priority of the $i^{th}$ priority execution range, until a priority execution range includes a second virtual object, and the priority execution range is determined as the priority execution range of the first operation.

Figure 6A:
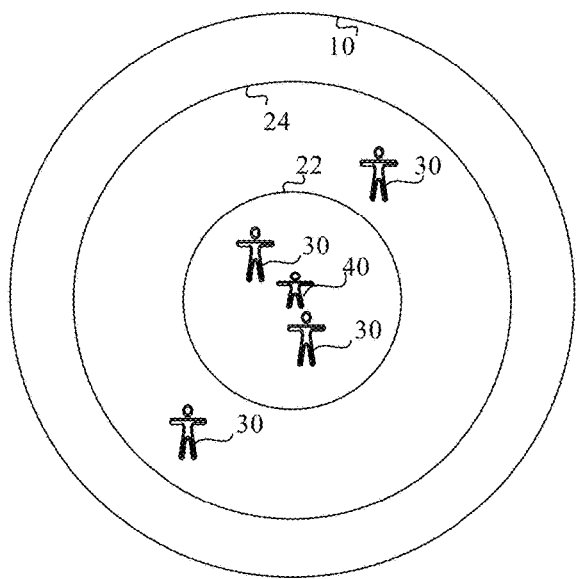
FIG. 6A and FIG. 6B are schematic diagrams of a priority execution range according to another embodiment of this disclosure.
Figure 6B:
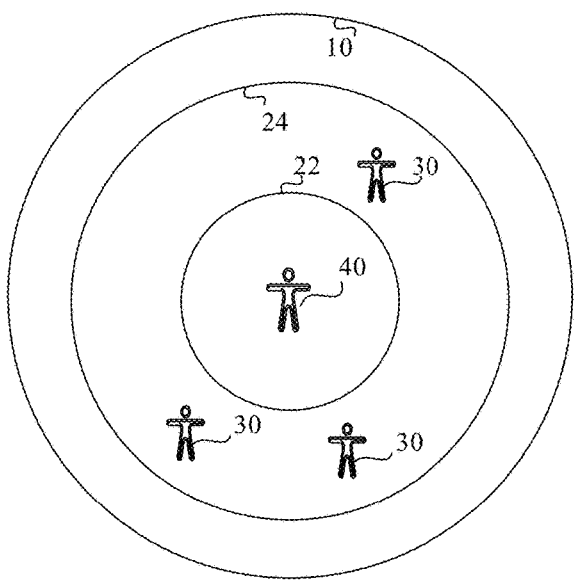

For example, as shown in FIG. 6A and FIG. 6B, it is assumed that both the set execution range and the priority execution range are circular regions, and the set execution range 10 of the first operation includes two priority execution ranges, which are a priority execution range 22 and a priority execution range 24, respectively. Circle center positions of the priority execution range 22 and the priority execution range 24 coincide with the circle center position of the set execution range 10 (for example, a position of the first virtual object 40 in the virtual environment), and both radiuses of the priority execution ranges 22 and the priority execution range 24 are less than a radius of the set execution range 10. It is assumed that a priority of the priority execution range is in negative correlation with a radius of the priority execution range. As shown in FIG. 6A and FIG. 6B, because the radius of the priority execution range 22 is less than the radius of the priority execution range 24, the priority of the priority execution range 22 is higher than the priority of the priority execution range 24. As shown in FIG. 6A, it is assumed that there are second virtual objects 30 within the priority execution range 22 and outside the priority execution range 22, but when selecting a target virtual object, the client selects the target virtual object based on the second virtual objects 30 in the priority execution range 22. As shown in FIG. 6B, it is assumed that there is no second virtual object 30 within the priority execution range 22, and there are the second virtual objects 30 outside the priority execution range 22 and within the priority execution range 24, the client selects the target virtual object based on the second virtual objects 30 in the priority execution range 24.

The set execution range and the priority execution range in FIG. 4, FIG. 5, FIG. 6A, and FIG. 6B use the circular region as an example. However, in the virtual environment, due to a factor such as perspectivity, the set execution range and the priority execution range may be, alternatively, elliptical regions.

Based on the foregoing, according to the technical solution provided in this embodiment, when a set execution range of an operation includes only one priority execution range, the priority execution range is directly determined as a priority execution range of the operation, thereby providing a simple manner of determining the priority execution range.

In addition, according to the technical solution provided in this embodiment, when a set execution range of an operation includes a plurality of priority execution ranges, a priority execution range that has a highest priority and that includes a virtual object on which the operation can be performed in the plurality of priority execution ranges is determined as a priority execution range of the operation, so that a manner of determining the priority execution range of the operation is provided when the plurality of priority execution ranges are set. In addition, in this embodiment, the plurality of priority execution ranges are in a nested relationship, and a priority execution range with a relatively high priority is nested in a priority execution range with a relatively low priority, so that it can be ensured that when selecting a target virtual object, the client starts selecting the target virtual object from a priority execution range with a smallest range, to achieve an effect in which a finally determined priority execution range of the operation is as small as possible, thereby facilitating further improvement of the effectiveness of the target virtual object.

A target virtual object selection process is described below.

In one implementation, step S140 includes the following steps.

(1) Sort Priorities of Second Virtual Objects in the Priority Execution Range, to Obtain a Priority Sorting Result.

When the priority execution range of the first operation is determined and there is a second virtual object in the priority execution range, the client may sort priorities of the second virtual objects in the priority execution range, to obtain a priority sorting result, so as to determine a priority order of the second virtual objects, thereby quickly selecting the target virtual object.

When sorting the priorities, the client may determine the priorities of the second virtual objects based on particular reference sorting information. In an example, step (1) includes: obtaining reference sorting information and a weight value corresponding to the reference sorting information; determining the priorities of the second virtual objects in the priority execution range according to the reference sorting information and the weight value corresponding to the reference sorting information; and sorting the priorities of the second virtual objects in the priority execution range according to the priorities.

The reference sorting information includes at least one of a life value, a distance value, an energy value, a level value, and an attacked state. The following describes the distance value, the level value, and the attacked state in the reference sorting information respectively.

The distance value refers to a distance between the second virtual object and a center position of the priority execution range. In an embodiment, the center position of the priority execution range is a position of the first virtual object in the virtual environment, and a distance value of the second virtual object refers to a distance between the second virtual object and the first virtual object. Generally, the center position of the priority execution range is a position in which an operation effect of the first operation is strongest. For example, when the first operation is an attack skill, the center position is a position in which the attack is strongest, and the target virtual object is selected based on the distance value, so that it can be ensured that the target virtual object is subject to a relatively strong operation effect of the first operation, thereby ensuring effective execution of the first operation.

The level value is used for indicating an operation capability of a user corresponding to the second virtual object. Generally, a user corresponding to a second virtual object with a relatively high level value has a stronger operation capability. A second virtual object with a relatively low level value may be preferentially selected based on the level value as the target virtual object. In this way, when the first operation is the attack skill, an operation such as striking back may be prevented from being performed in time on the first virtual object controlled by the user due to a relatively strong operation capability of the user corresponding to the second virtual object, or when the first operation is a skill of increasing an amount of health, an amount of health of the second virtual object of the user with a relatively weak operation capability may be increased in time, to avoid a case that a game fails because the user corresponding to the second virtual object cannot perform an operation.

The attacked state refers to whether the second virtual object is attacked currently. The target virtual object is selected based on the attacked state, and it can be ensured that an operation effect of the first operation on the second virtual object matches a requirement of a user corresponding to the first virtual object. For example, when the first operation is the attack skill, a second virtual object that is attacked currently is preferentially selected as the target virtual object, and the operation effect of the first operation may be enhanced. When the first operation is a skill of increasing an amount of health, a second virtual object that is attacked currently is preferentially selected as the target virtual object, and the amount of health of the second virtual object may be supplemented in time, thereby ensuring the operation effect of the first operation.

In a priority sorting process, only one piece of reference sorting information may be used, for example, only a distance value is used as the reference sorting information, or a plurality of pieces of reference sorting information may be used, for example, a distance value, a level value, and an attacked state are used as the reference sorting information. When only one piece of reference sorting information is used, a weight value may not be set for the reference sorting information, and the priorities of the second virtual objects are directly sorted based on the reference sorting information. When a plurality of pieces of reference sorting information are used, weight values may be set for the plurality of pieces of reference sorting information respectively, and then the priorities of the second virtual object are sorted based on the plurality of pieces of reference sorting information and the weight values thereof.

When the plurality of pieces of reference sorting information are used, the weight values of the plurality of pieces of reference sorting information may be the same or may be different. This is not limited in this embodiment. In an embodiment, the weight values of the plurality of pieces of reference sorting information are set by the client randomly; or the weight values of the plurality of pieces of reference sorting information are preset by a user. For example, when the reference sorting information is a distance value, a level value, and an attacked state, the user may preset a weight value of the distance value to 60%, a weight value of the level value to 20%, and a weight value of the attacked state to 20%. The weight values of the plurality of pieces of reference sorting information are preset by the user, and the priority sorting result may match a requirement of the user more closely.

(2) Determine the Target Virtual Object According to the Priority Sorting Result.

After sorting the priorities of the second virtual objects in the priority execution range, the client may determine the target virtual object according to the obtained priority sorting result. A manner of determining the target virtual object is not limited in this embodiment. In an embodiment, the client determines a second virtual object that has a highest priority as a target virtual object; or the client determines a second virtual object of which a priority is higher than a target priority as a target virtual object; or the client determines a second virtual object of which a priority is within a target range as a target virtual object.

In an example, step (2) includes: obtaining state information of the first virtual object; determining, according to the state information, a target condition used for selecting the target virtual object; and determining a second virtual object of which a priority meets the target condition as the target virtual object.

The state information of the first virtual object includes at least one of the following: a life value, an energy value, and a level value. The client determines, according to the state information of the first virtual object, a target condition used for selecting the target virtual object. For example, when a life value of the first virtual object is relatively low (for example, less than a life value threshold), it is determined that the target condition is a highest priority. In this way, the first operation may be prevented from being performed on a plurality of virtual objects when the life value of the first virtual object is relatively weak. The target condition is determined according to the state information of the first virtual object, and it can be ensured that a selected target virtual object matches a current state of the first virtual object, thereby improving the immersive experience of a game.

In another example, step (2) includes: obtaining attribute information corresponding to the first operation; determining, according to the attribute information, a target condition used for selecting the target virtual object; and determining a second virtual object of which a priority meets the target condition as the target virtual object.

The attribute information includes an execution range and/or an operation effect. The client determines, according to attribute information corresponding to the first operation, a target condition used for selecting the target virtual object. For example, when an execution range of the first operation is relatively large, it may be determined that the target condition is that a priority is greater than a target priority. In this way, a function may be generated on a plurality of virtual objects simultaneously, thereby improving a function effect of the first operation. The target condition is determined according to the attribute information corresponding to the first operation, and it can be ensured that a selected target virtual object matches the first operation, thereby improving the function effect of the first operation.

In an actual application, the target condition may be determined with reference to the above examples, so that a selected target virtual object is more optimized, thereby improving the immersive experience of a game. For example, priorities of second virtual objects in the priority execution range are directly determined, and then the target virtual object is determined according to the priorities of the second virtual objects, which are included in the protection scope of this disclosure.

To provide more autonomous selection space for the user, and ensure that a selected target virtual object matches a requirement of the user, in this embodiment, the user may set information or a condition used in selection of the target virtual object. In one implementation, the method further includes: displaying a condition setting interface; receiving an information setting instruction, to set information used in a sorting process of the priorities; generating reference sorting information and a weight value corresponding to the reference sorting information according to the information setting instruction; receiving a condition setting instruction, to set a priority of the target virtual object; and generating, according to the condition setting instruction, a target condition used for selecting the target virtual object. That is, for the technical solution in which the target virtual object is selected according to the priority sorting result, the user may set information used in a sorting process of the priorities and a condition that the target virtual object needs to meet, to ensure that a selected target virtual object meets a requirement of the user.

Based on the foregoing, according to the technical solution provided in this embodiment, a target virtual object is selected based on a priority execution range of an operation, priorities of virtual objects on which the operation is performed in the priority execution range are first sorted, and then the target virtual object is selected from the virtual objects according to a priority sorting result. Because reference sorting information used in a sorting process of the priorities may be autonomously set by the user, the selected target virtual object in this embodiment better meets a preference of the user. In addition, according to this embodiment, a plurality of pieces of reference sorting information and weight values corresponding to the plurality of pieces of reference sorting information are used, and priorities of the virtual objects are sorted from a plurality of dimensions with a focus, to fully consider a factor that affects the priorities of the virtual objects, thereby further improving a matching degree between the target virtual object and a requirement of the user.

Figure 7:
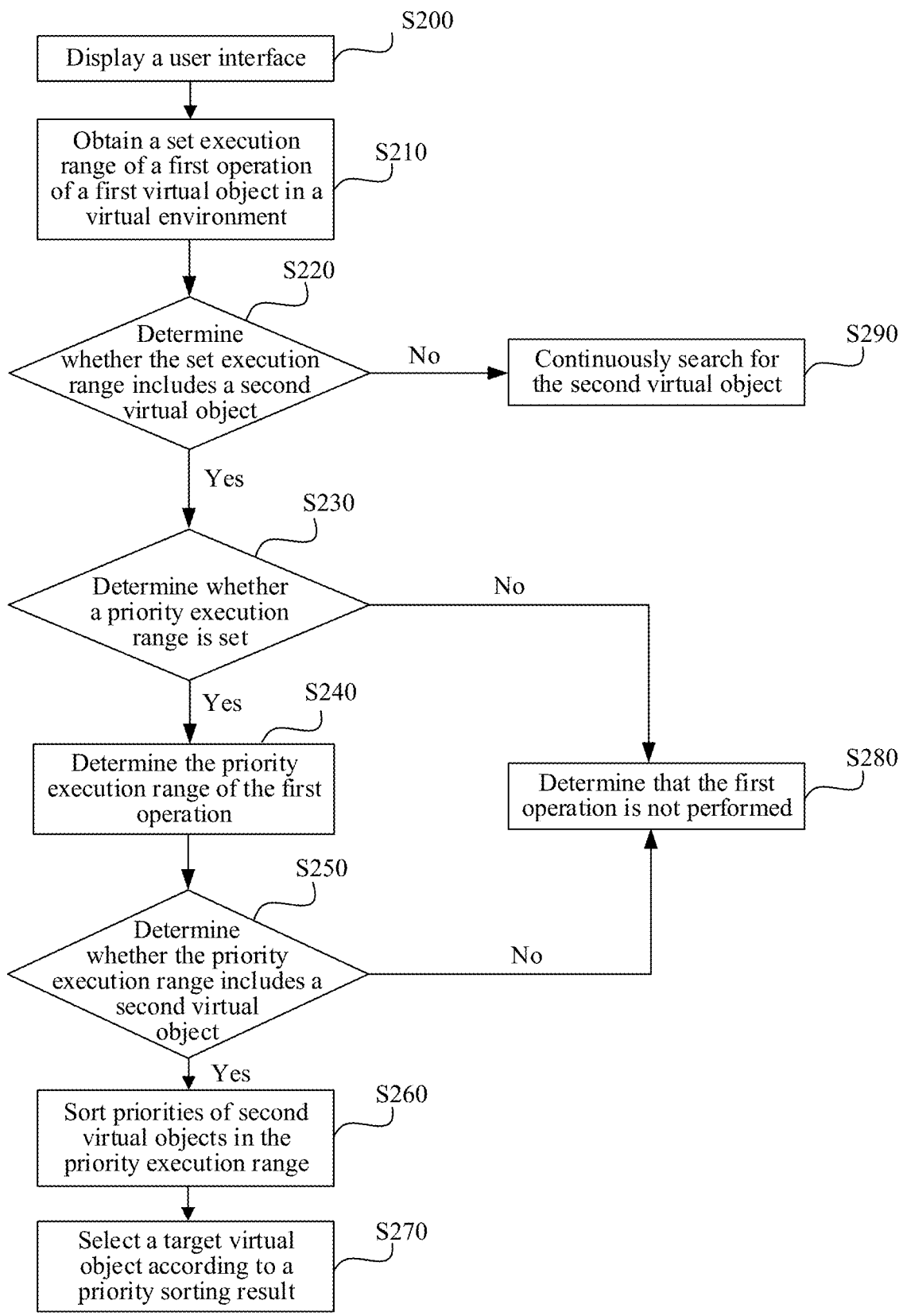
FIG. 7 is a flowchart of a virtual object selection method according to another embodiment of this disclosure.

FIG. 7 is a flowchart of a virtual object selection method according to an embodiment of this disclosure. The method is applicable to a client of the application, for example, applicable to the client (hereinafter referred to as the "client") installed on the terminal 100 in the application run environment shown in FIG. 1. The method may include the following several steps (S200 to S290).

In Step S200, a UI is displayed. The UI includes a display picture corresponding to a virtual environment and a first virtual object located in the virtual environment. When receiving a start instruction of an application triggered by a user, the client may control running of the application and display a UI corresponding to the application. The UI includes a display picture corresponding to a virtual environment and a first virtual object in the virtual environment, and the first virtual object may be a virtual object controlled by the user.

In Step S210, a set execution range of a first operation of the first virtual object in the virtual environment is obtained. The first operation is any interactive operation between the first virtual object and the virtual environment. The set execution range is a function range of the first operation, and set execution ranges corresponding to different first operations may be different.

In Step S220, whether the set execution range includes a second virtual object is determined. After determining the set execution range, the client further determines whether the set execution range includes a second virtual object, performs step S230 when the set execution range includes the second virtual object, and performs step S290 when the set execution range does not include the second virtual object.

In Step S230, whether a priority execution range is set is determined. When the set execution range includes the second virtual object, the client further determines whether a priority execution range with a relatively small range is set, the priority execution range being within the set execution range and smaller than the set execution range. Step S240 is performed when the priority execution range is set, and step S280 is performed when the priority execution range is not set.

In Step S240, the priority execution range of the first operation is determined. When the client is provided with the priority execution range, the client needs to determine the priority execution range corresponding to the first operation.

In Step S250, whether the priority execution range includes a second virtual object is determined. After the priority execution range corresponding to the first operation is determined, whether the priority execution range includes a second virtual object is further determined, and step S260 is performed when the priority execution range includes the second virtual object, and step S280 is performed when the priority execution range does not include the second virtual object.

In Step S260, priorities of second virtual objects in the priority execution range are sorted. The client may sort priorities of the second virtual objects when the priority execution range includes second virtual objects. In an embodiment, the client may sort the priorities of the second virtual objects according to reference sorting information and a priority of the reference sorting information.

In Step S270, a target virtual object is selected according to a priority sorting result. The client selects a target virtual object according to a priority sorting result. In an embodiment, the client determines a second virtual object that has a highest priority as the target virtual object, the client determines a second virtual object of which a priority is higher than a target priority as the target virtual object, or the client determines a second virtual object of which a priority is within a target range as the target virtual object.

In Step S280, whether the first operation is not performed is determined. When the priority execution range does not include the second virtual object, it may be determined that the first operation is not performed, to prevent a use resource of the first operation from being wasted.

In Step S290, the second virtual object is continuously searched for. When the set execution range does not include the second virtual object, the client may continuously search for a second virtual object in the set execution range. In an embodiment, the client searches for a second virtual object for a preset duration to avoid relatively large processing overheads caused by endless searching for the second virtual object.

Figure 8:
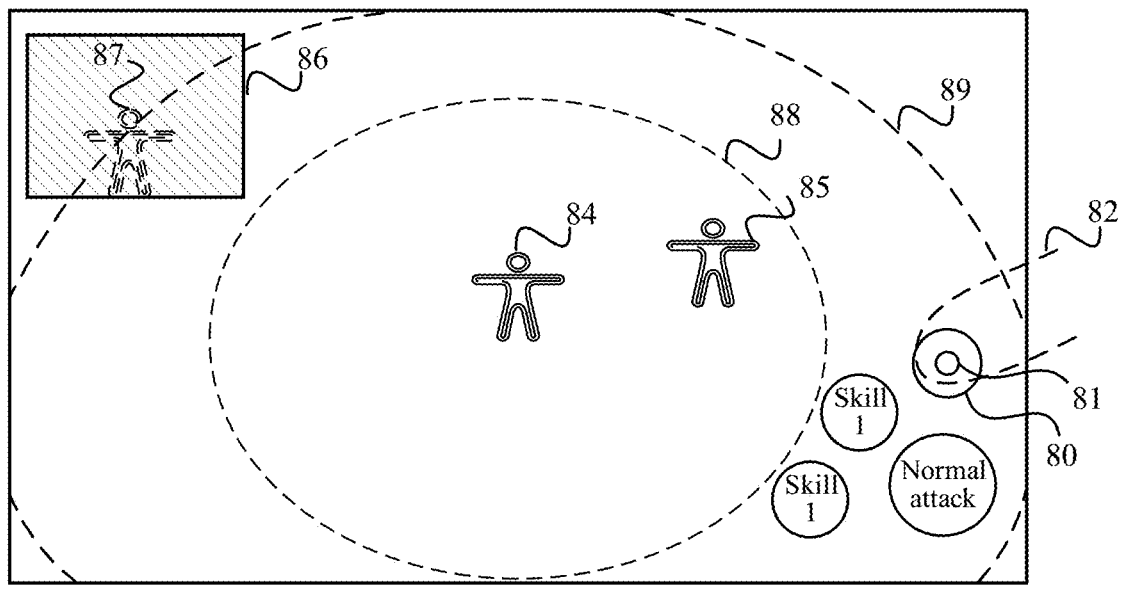
FIG. 8 is a schematic diagram of an application of a virtual object selection method according to an embodiment of this disclosure.

FIG. 8 is a schematic diagram of an application of a virtual object selection method according to an embodiment of this disclosure.

In a client of a shooting mobile game, a skill joystick is generally a virtual button in a game interface. To enable a user to perform both a quick casting operation and a manual aiming operation by using a skill button (virtual button), a setting region in a center of the virtual button is set. By determining an operation of the user in the setting region, it is determined whether the user or a first virtual object corresponding to the user performs the quick casting operation or the manual aiming operation. The quick casting operation is, for example, that after the user operates a skill button, the client actively chooses, according to a rule to aim at a target virtual object in a virtual environment, and controls the first virtual object corresponding to the user to shoot the target virtual object. The manual aiming operation is, for example, that by operating the skill button, the user manually controls the first virtual object to choose to aim at a target virtual object in the virtual environment and shoot the target virtual object.

In an example, as shown in FIG. 8, when a finger 82 of the user presses a setting region 81 in a skill button 80 and does not move out of the setting region 81, it is considered that the user controls a first virtual object 84 corresponding to the user to perform the quick casting operation. When the finger 82 of the user presses the setting region 81 in the skill button 80 and moves out of the setting region 81, it is considered that the user controls the first virtual object 84 corresponding to the user to perform the manual aiming operation. When the user performs the quick casting operation, the client may use the virtual object selection method according to the embodiments of this disclosure. In this way, although both a second virtual object 85 and a second virtual object 87 (which may be blocked by a small map 86) in a priority execution range 88 and a set execution range 89 meet a condition of a cast object of the quick casting operation, because the priority execution range 88 is set, the client preferentially searches for the second virtual object 85 closer to the first virtual object 84, and cast a skill corresponding to the quick casting operation to the second virtual object.

The following describes apparatus embodiments of this disclosure, which can be used to execute the method embodiments of this disclosure. For details not disclosed in the apparatus embodiments of this disclosure, refer to the method embodiments of this disclosure.

Figure 9:
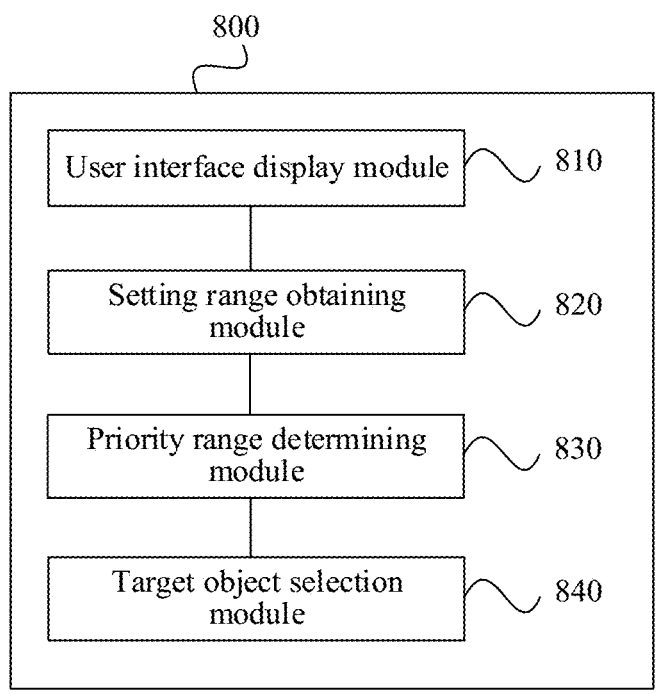
FIG. 9 is a block diagram of a virtual object selection apparatus according to an embodiment of this disclosure.

FIG. 9 is a block diagram of a virtual object selection apparatus according to an embodiment of this disclosure. The apparatus has functions of implementing the virtual object selection method. The functions may be implemented by using hardware (e.g., circuitry), or may be implemented by hardware executing corresponding software. The apparatus may be a terminal or may be disposed in a terminal. An apparatus 800 includes a user interface display module 810, a set range obtaining module 820, a priority range determining module 830, and a target object selection module 840. One or more of the modules of the apparatus can be implemented by processing circuitry, software, or a combination thereof, for example.

The user interface display module 810 is configured to display a display picture corresponding to a virtual environment and a first virtual object located in the virtual environment on a UI.

The set range obtaining module 820 is configured to obtain a set execution range of a first operation of the first virtual object in the virtual environment.

The priority range determining module 830 is configured to determine a priority execution range of the first operation in the virtual environment, the priority execution range being within the set execution range and smaller than the set execution range.

The target object selection module 840 is configured to select a second virtual object from the priority execution range as a target virtual object corresponding to the first operation.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In an exemplary embodiment, the set execution range includes one priority execution range, and the priority range determining module 830 is configured to determine the one priority execution range as the priority execution range of the first operation in the virtual environment.

In an exemplary embodiment, the set execution range includes n priority execution ranges, n being an integer greater than 1; and the priority range determining module 830 is configured to select, from the n priority execution ranges, a priority execution range that has a highest priority and includes the second virtual object, and determine the priority execution range as the priority execution range of the first operation in the virtual environment.

In an exemplary embodiment, the n priority execution ranges are in a nested relationship, an $i^{th}$ priority execution range falls within an $(i+1)^{th}$ priority execution range, and a priority of the $i^{th}$ priority execution range is higher than a priority of the $(i+1)^{th}$ priority execution range, i being a positive integer.

Figure 10:
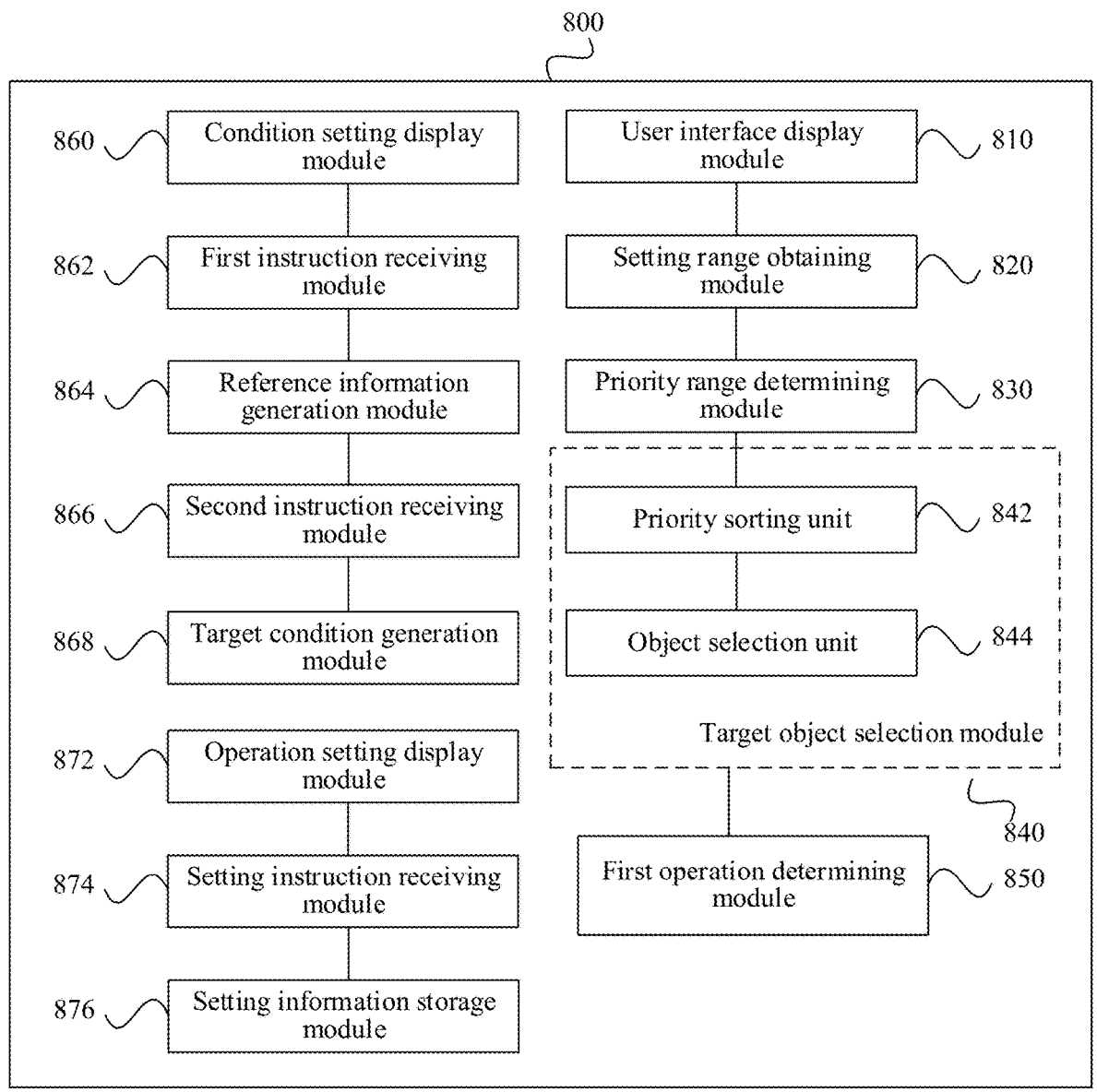
FIG. 10 is a block diagram of a virtual object selection apparatus according to another embodiment of this disclosure.

In an exemplary embodiment, as shown in FIG. 10, the apparatus 800 further includes a first operation determining module 850 configured to determine, in response to that the priority execution range does not include the second virtual object, that the first operation is not performed.

In an exemplary embodiment, as shown in FIG. 10, the target object selection module 840 includes: a priority sorting unit 842 configured to sort priorities of second virtual objects in the priority execution range, to obtain a priority sorting result; and an object selection unit 844, configured to determine the target virtual object according to the priority sorting result.

In an exemplary embodiment, as shown in FIG. 10, the priority sorting unit 842 is configured to obtain reference sorting information and a weight value corresponding to the reference sorting information, the reference sorting information including at least one of the following: a life value, a distance value, an energy value, a level value, and an attacked state; determine the priorities of the second virtual objects in the priority execution range according to the reference sorting information and the weight value corresponding to the reference sorting information; and sort the priorities of the second virtual objects in the priority execution range according to the priorities.

In an exemplary embodiment, as shown in FIG. 10, the object selection unit 844 is configured to obtain state information of the first virtual object, the state information including at least one of the following: a life value, an energy value, and a level value; determine, according to the state information, a target condition used for selecting the target virtual object; and determine a second virtual object of which a priority meets the target condition as the target virtual object.

In an exemplary embodiment, as shown in FIG. 10, the object selection unit 844 is configured to obtain attribute information corresponding to the first operation, the attribute information including an execution range and/or an operation effect; determine, according to the attribute information, a target condition used for selecting the target virtual object; and determine a second virtual object of which a priority meets the target condition as the target virtual object.

In an exemplary embodiment, as shown in FIG. 10, the apparatus 800 further includes: a condition setting display module 860 configured to display a condition setting interface; a first instruction receiving module 862 configured to receive an information setting instruction, to set information used in a sorting process of the priorities; a reference information generation module 864 configured to generate reference sorting information and a weight value corresponding to the reference sorting information according to the information setting instruction; a second instruction receiving module 866 configured to receive a condition setting instruction, to set a priority of the target virtual object; and a target condition generation module 868 configured to generate, according to the condition setting instruction, a target condition used for selecting the target virtual object.

In an exemplary embodiment, as shown in FIG. 10, the apparatus 800 further includes: an operation setting display module 872 configured to display an operation setting interface; a setting instruction receiving module 874 configured to receive a range setting instruction, to set the priority execution range of the first operation, or to set a priority execution range of a first type operation, the first type operation being an operation of which an operation distance is greater than a threshold; and a setting information storage module 876 configured to store setting information of the priority execution range according to the range setting instruction.

Based on the foregoing, according to the technical solution provided in this embodiment of this disclosure, a set execution range of an operation of a virtual object controlled by a user is obtained, then a priority execution range of the operation that falls within the set execution range and that is smaller than the set execution range is determined, and a target virtual object on which the operation is performed is selected from the priority execution range. Because the set execution range and the priority execution range are automatically determined by the client according to a rule or a pre-stored setting, the user does not need to spend a large amount of time to touch an operation button corresponding to the operation to select an execution range, thereby reducing operation time costs of the user and improving the operation efficiency. In addition, in this embodiment, the client selects the target virtual object based on the priority execution range with a relatively small range, to avoid a case that due to an excessively large set execution range, a finally selected target virtual object in the virtual environment exceeds a UI displayed by the client, is located at the edge of a UI, or is blocked by an icon in a UI, thereby ensuring that the user can view a function effect of the operation on the target virtual object while improving the effectiveness of the target virtual object and the accuracy of the operation of the target virtual object, and improving a display effect of the UI. In addition, in this embodiment, the priority execution range is set within the set execution range, and a selection condition of the target virtual object may be enriched, so that a selection process of the target virtual object is more flexible. In addition, because the priority execution range is smaller than the set execution range, a stricter condition is set for selection of the target virtual object, so that the selection process of the target virtual object is more strategic, thereby saving computing resources.

When the apparatus provided in the foregoing embodiments implements functions of the apparatus, the division of the foregoing functional modules is merely an example for description. In an actual application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to one conception. For the specific implementation process, refer to the method embodiments, and details are not described herein again.

Figure 11:
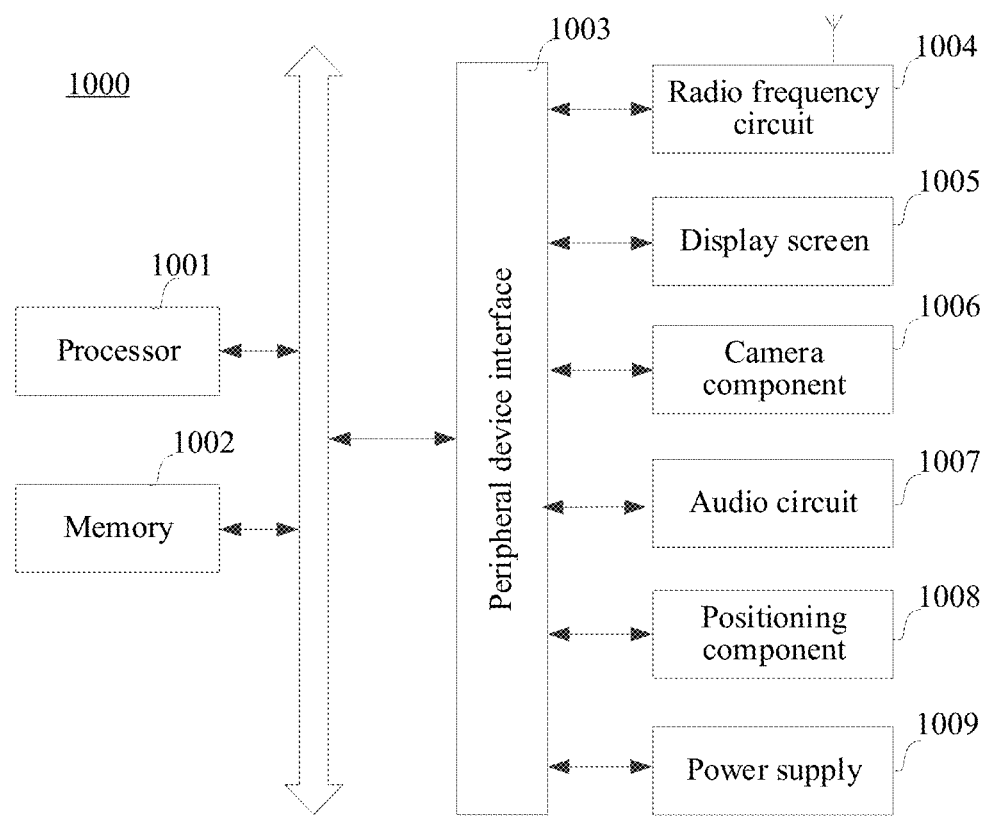
FIG. 11 is a structural block diagram of a terminal according to an embodiment of this disclosure.

FIG. 11 is a structural block diagram of a terminal 1000 according to an embodiment of this disclosure. The terminal 1000 may be, for example, a mobile phone, a tablet computer, a game console, an e-book reader, a multimedia player, a wearable device, or a PC. A client run on the terminal is configured to implement the virtual object selection method provided in the foregoing embodiments. The terminal may be the terminal 100 in the application run environment shown in FIG. 1.

Specifically, the terminal 1000 generally includes a processor 1001 and a memory 1002. The processor 1001 may include one or more processing cores, and may be, for example, a 4-core processor or an 8-core processor. The processor 1001 may be implemented by using at least one hardware form of digital signal processor (DSP), a field-programmable gate array (FPGA), and a programmable logic array (PLA). The processor 1001 may alternatively include a main processor and a coprocessor. The main processor is a processor that is configured to process data in an awake state and also referred to as a central processing unit (CPU), and the coprocessor is a low-power processor configured to process data in an idle state. In some embodiments, the processor 1001 may be integrated with a graphics processing unit (GPU). The GPU is configured to render and draw content that needs to be displayed on a display screen. In some embodiments, the processor 1001 may further include an artificial intelligence (AI) processor. The AI processor is configured to process computing operations related to machine learning.

The memory 1002 may include one or more computer-readable storage media. The computer-readable storage medium may be non-transitory. The memory 1002 may further include a high-speed random access memory and a non-volatile memory, for example, one or more magnetic disk storage devices or flash memory devices.

In some embodiments, a non-transitory computer-readable storage medium in the memory 1002 is configured to store at least one instruction, at least one program, a code set, or an instruction set, the at least one instruction, the at least one program, the code set, or the instruction set being configured to be executed by one or more processors to implement the virtual object selection method.

In some embodiments, the terminal 1000 may include: a peripheral device interface 1003 and at least one peripheral device. The processor 1001, the memory 1002, and the peripheral device interface 1003 may be connected by using a bus or a signal cable. Each peripheral device may be connected to the peripheral device interface 1003 by using a bus, a signal cable, or a circuit board. Specifically, the peripheral device includes: at least one of a radio frequency (RF) circuit 1004, a touch display screen 1005, a camera component 1006, an audio circuit 1007, a positioning component 1008, and a power supply 1009.

A person skilled in the art may understand that the structure shown in FIG. 11 constitutes no limitation on the terminal 1000, and the terminal may include more or fewer components than those shown in the figure, or some components may be combined, or a different component deployment may be used.

In an exemplary embodiment, a non-transitory computer-readable storage medium is further provided, the storage medium storing at least one instruction, at least one program, a code set, or an instruction set, the at least one instruction, the at least one program, the code set, or the instruction set, when executed by the processor, implementing the virtual object selection method.

In an embodiment, the non-transitory computer-readable storage medium may include: a read-only memory (ROM), a random access memory (RAM), a solid state drive (SSD), an optical disc, or the like. The RAM may include a resistance random access memory (ReRAM) and a dynamic random access memory (DRAM).

In an exemplary embodiment, a computer program product is further provided, the computer program product, when executed by a processor, implementing the virtual object selection method.

It is to be understood that "plurality of" mentioned in this specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this disclosure.

The foregoing descriptions are merely exemplary embodiments of this disclosure, but are not intended to limit this disclosure. Any modification, equivalent replacement, or improvement made within the spirit and principle of this disclosure shall fall within the protection scope of this disclosure.

What is claimed is:

1. A virtual object selection method, comprising:
   displaying, on a user interface, a display picture corresponding to a virtual environment and a first virtual object located in the virtual environment;
   obtaining a set execution range of a first operation of the first virtual object in the virtual environment;
   determining a priority execution range of the first operation in the virtual environment, the priority execution range being within the set execution range and smaller than the set execution range; and
   selecting a second virtual object from the priority execution range as a target virtual object corresponding to the first operation by sorting priorities of plural second virtual objects in the priority execution range, a priority of a respective one of the plural second virtual objects being calculated according to reference sorting information including at least one of a life value, a distance value, an energy value, a level value, or an attacked state of the respective one of the plural second virtual objects.

2. The method according to claim 1, wherein the set execution range comprises one priority execution range; and
   the determining a priority execution range of the first operation in the virtual environment further comprises determining the one priority execution range as the priority execution range of the first operation in the virtual environment.

3. The method according to claim 1, wherein the set execution range comprises n priority execution ranges, n being an integer greater than 1; and
   the determining a priority execution range of the first operation in the virtual environment further comprises selecting, from the n priority execution ranges, a priority execution range that has a highest priority and that comprises the second virtual object, and determining the priority execution range as the priority execution range of the first operation in the virtual environment.

4. The method according to claim 3, wherein the n priority execution ranges are in a nested relationship, an $i^{th}$ priority execution range falls within an $(i+1)^{th}$ priority execution range, and a priority of the $i^{th}$ priority execution range is higher than a priority of the $(i+1)^{th}$ priority execution range, i being a positive integer.

5. The method according to claim 1, further comprising:
   determining, in response to determining that the priority execution range does not comprise the second virtual object, that the first operation is not performed.

6. The method according to claim 1, wherein the selecting further comprises:
   determining the target virtual object according to a sorting result of the sorting of the priorities of the plural second virtual objects in the priority execution range.

7. The method according to claim 6, wherein the sorting further comprises:
   obtaining one or more weight values corresponding to the reference sorting information;
   determining the priorities of the second virtual objects in the priority execution range according to the reference sorting information and the one or more weight values corresponding to the reference sorting information; and
   sorting the priorities of the second virtual objects in the priority execution range according to the determined priorities.

8. The method according to claim 6, wherein the determining the target virtual object according to the sorting result further comprises:
   obtaining state information of the first virtual object, the state information including at least one of a life value, an energy value, and a level value;
   determining, according to the obtained state information, a target condition for selecting the target virtual object; and
   determining a second virtual object, which meets the target condition, as the target virtual object.

9. The method according to claim 6, wherein the determining the target virtual object according to the sorting result further comprises:
   obtaining attribute information corresponding to the first operation, the attribute information including at least one of an execution range and an operation effect;
   determining, according to the obtained attribute information, a target condition for selecting the target virtual object; and
   determining a second virtual object, which meets the target condition, as the target virtual object.

10. The method according to claim 6, further comprising:
    displaying a condition setting interface;
    receiving an information setting instruction, to set information used in a sorting process of the priorities;
    generating the reference sorting information and a weight value corresponding to the reference sorting information according to the information setting instruction;
    receiving a condition setting instruction, to set a priority of the target virtual object; and
    generating, according to the received condition setting instruction, a target condition for selecting the target virtual object.

11. The method according to claim 1, further comprising:
    displaying an operation setting interface;
    receiving a range setting instruction, to set the priority execution range of the first operation, or to set a priority execution range of a first type operation, the first type operation being an operation for which an operation distance is greater than a threshold; and
    storing setting information of the priority execution range according to the range setting instruction.

12. The method according to claim 1, wherein the set execution range of the first operation defines a maximum shooting range of the first operation.

13. The method according to claim 1, wherein, when no second virtual object exists in the priority execution range, the method further comprises selecting the second virtual object from an area inside the set execution range and outside the priority execution range.

14. A virtual object selection apparatus, comprising:
processing circuitry configured to
cause a display picture to be displayed corresponding to a virtual environment and a first virtual object located in the virtual environment on a user interface (UI);
obtain a set execution range of a first operation of the first virtual object in the virtual environment;
determine a priority execution range of the first operation in the virtual environment, the priority execution range being within the set execution range and smaller than the set execution range; and
select a second virtual object from the priority execution range as a target virtual object corresponding to the first operation by sorting priorities of plural second virtual objects in the priority execution range, a priority of a respective one of the plural second virtual objects being calculated according to reference sorting information including at least one of a life value, a distance value, an energy value, a level value, or an attacked state of the respective one of the plural second virtual objects.

15. The virtual object selection apparatus according to claim 14, wherein the set execution range comprises one priority execution range; and
the processing circuitry is further configured to determine the one priority execution range as the priority execution range of the first operation in the virtual environment.

16. The virtual object selection apparatus according to claim 14, wherein the set execution range comprises n priority execution ranges, n being an integer greater than 1; and
the processing circuitry is further configured to select, from the n priority execution ranges, a priority execution range that has a highest priority and that comprises the second virtual object, and determining the priority execution range as the priority execution range of the first operation in the virtual environment.

17. The virtual object selection apparatus of claim 16, wherein the n priority execution ranges are in a nested relationship, an $i^{th}$ priority execution range falls within an $(i+1)^{th}$ priority execution range, and a priority of the $i^{th}$ priority execution range is higher than a priority of the $(i+1)^{th}$ priority execution range, i being a positive integer.

18. The virtual object selection apparatus of claim 14, wherein the circuitry is further configured to determining, in response to determining that the priority execution range does not comprise the second virtual object, that the first operation is not performed.

19. The virtual object selection apparatus of claim 14, wherein the circuitry is further configured to:
determine the target virtual object according to a sorting result of the sorting of the priorities of the plural second virtual objects in the priority execution range.

20. A non-transitory computer-readable storage medium, storing computer-readable instructions, which, when executed by processing circuitry, cause the processing circuitry to implement a virtual object selection method, comprising:
displaying, on a user interface, a display picture corresponding to a virtual environment and a first virtual object located in the virtual environment;
obtaining a set execution range of a first operation of the first virtual object in the virtual environment;
determine a priority execution range of the first operation in the virtual environment, the priority execution range being within the set execution range and smaller than the set execution range; and
selecting a second virtual object from the priority execution range as a target virtual object corresponding to the first operation by sorting priorities of plural second virtual objects in the priority execution range, a priority of a respective one of the plural second virtual objects being calculated according to reference sorting information including at least one of a life value, a distance value, an energy value, a level value, or an attacked state of the respective one of the plural second virtual objects.

* * * * *